Aug. 25, 1970   F. E. CONNER, JR   3,525,435
DISPOSABLE FILTER CARTRIDGE FOR AQUARIUMS
Filed March 19, 1968   2 Sheets-Sheet 1
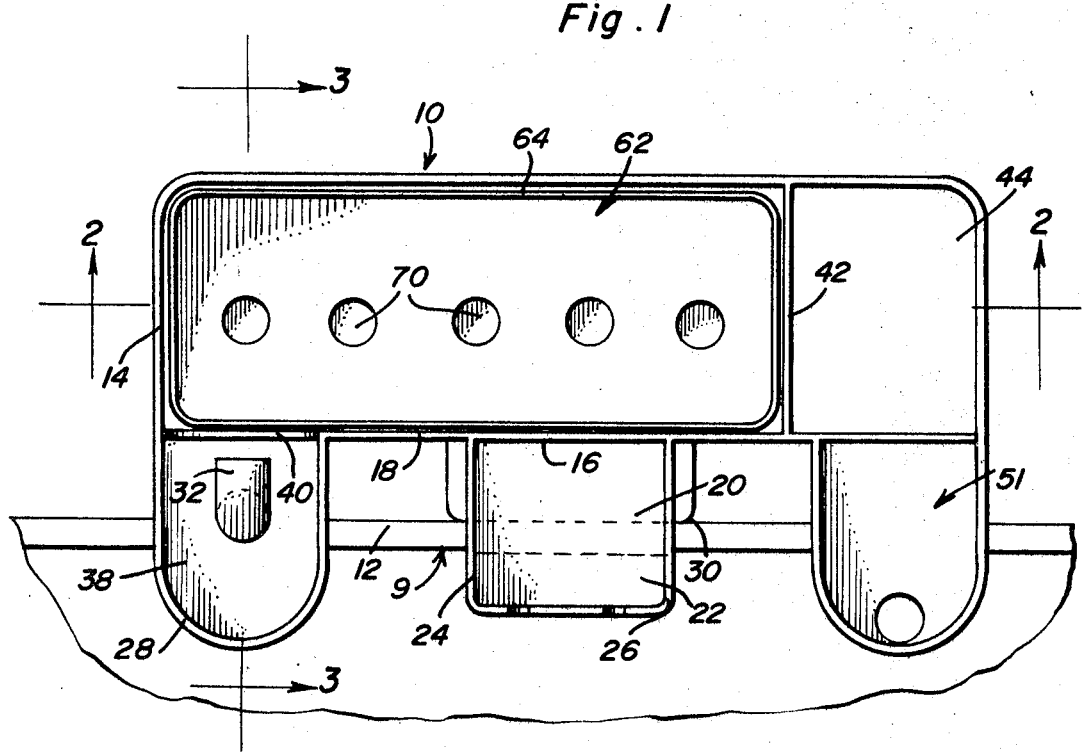
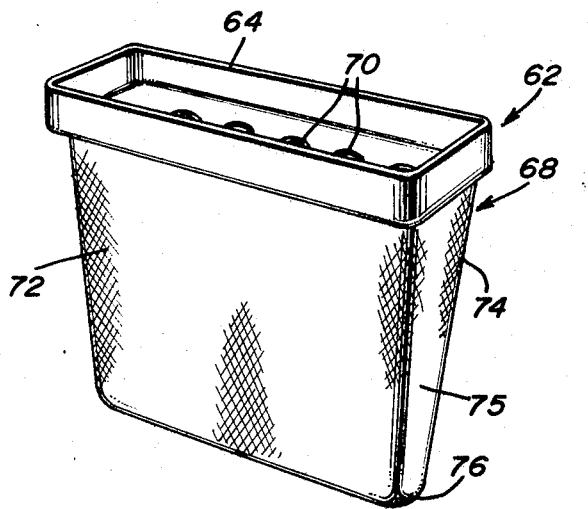
Frank E. Conner, Jr.
*INVENTOR.*
BY *Clarence A. O'Brien*
*and Harvey B. Jacobson*
Attorneys Aug. 25, 1970    F. E. CONNER, JR    3,525,435
DISPOSABLE FILTER CARTRIDGE FOR AQUARIUMS
Filed March 19, 1968    2 Sheets-Sheet 2
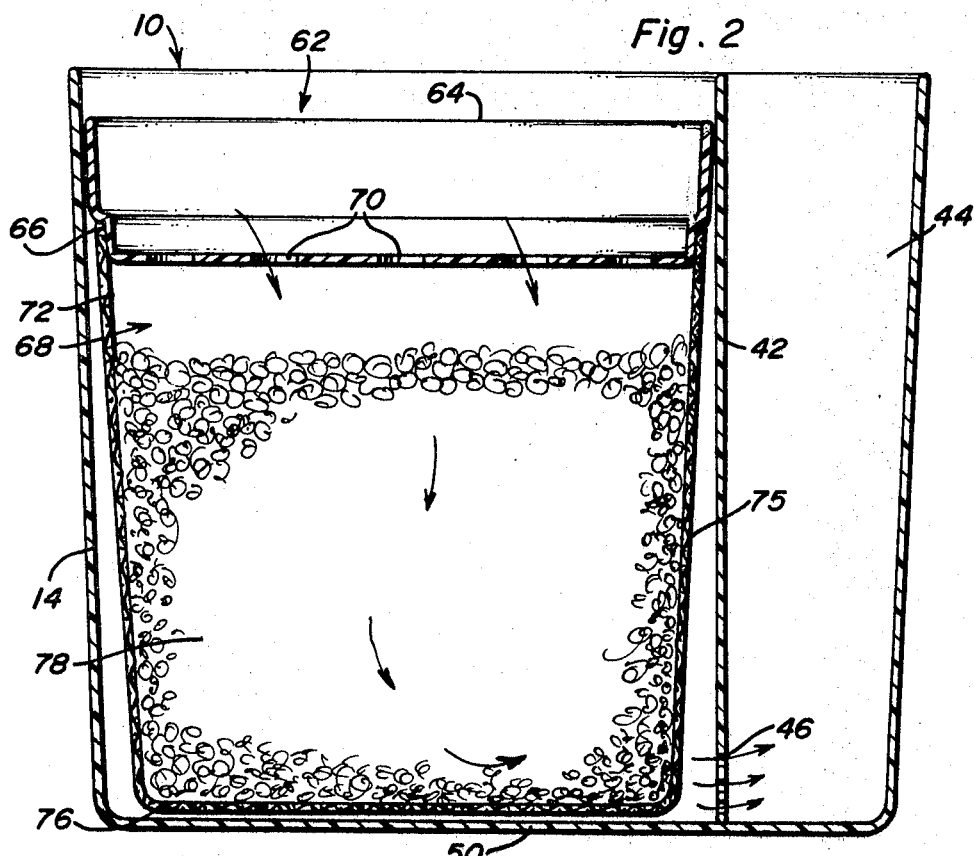
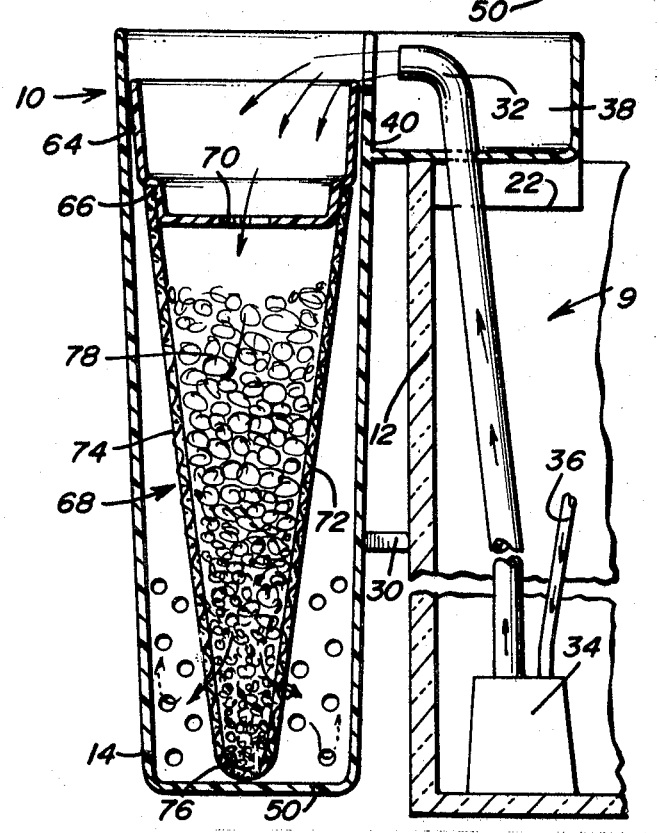
Frank E. Conner, Jr.
INVENTOR.

United States Patent Office 3,525,435
Patented Aug. 25, 1970

3,525,435
DISPOSABLE FILTER CARTRIDGE FOR
AQUARIUMS
Frank E. Conner, Jr., 703½ Grace Ave.,
Charleston, W. Va. 25302
Filed Mar. 19, 1968, Ser. No. 714,193
Int. Cl. E04h 3/20
U.S. Cl. 210—169    3 Claims

ABSTRACT OF THE DISCLOSURE

A unitary filter cartridge including a water channelling top tray-like portion, the bottom of which includes perforations therein. A frusto-conical porous filtering envelope appends downwardly from the tray bottom to which it is suitably attached. The porous envelope includes granular charcoal therein for purifying water conducted therethrough from the tray portion.

---

This invention relates to a filtering cartridge and more particularly to a filtering cartridge for use with water recirculated through a fish tank or aquarium.

The prior art includes a number of filter devices for purifying water circulated from a fish tank. These filters usually consist of a plastic box divided into two compartments, the two compartments being separated by a divider which is slotted or perforated to allow passage of water between the compartments. One compartment is usually several times as large as the other, the larger compartment being generally filled with a purifying layer of charcoal on the bottom thereof and a layer of loosely packed filtering glass wool on top of the charcoal layer. The filter is hung on the outside edge of an aquarium. Water is circulated to a top surface of the glass wool which functions as a filtering surface by means of a pump or air jet siphon. The filtered water is passed through the charcoal for purification and then redeposited within the aquarium. The principal disadvantage of this type of filter becomes manifest when the filter becomes impregnated with sediment thereby requiring the replacement thereof. In order to effectuate such replacement, it is necessary to dismantle the entire filter structure and remove the glass wool and charcoal therefrom. Once cleaned, new quantities of glass wool and charcoal are deposited in the filter. Other forms of prior constructions include a cartridge with a filtering substance contained therein. However, when such a filter becomes laden with sediment and requires maintenance, it is necessary to disassemble the cartridge and refill same with a suitable filtering substance. This latter type of cartridge is often submerged within the liquid contained in a tank or aquarium thereby causing an individual inconvenience in the removal thereof from the water.

In summary, the present invention includes a cartridge element which may be simply removed from the top of a filter structure secured to the side of an aquarium or tank. Such a filter structure is shown and described in Pat. 3,152,987 issued Oct. 13, 1964 to M. R. Gare and includes a tank or reservoir portion which is opened at the top. Instead of utilizing a filtering layer of glass wool and an additional layer of purifying charcoal contained within the tank portion, the present filter cartridge may be inserted in their stead. Thus, when it becomes necessary to replace the filtering material, the unitary cartridge is simply lifted from the filter structure and discarded. A new cartridge is simply dropped into place thereby renewing efficient operation of the filter once again. It is noted that no time consuming or inconvenient dismantling is necessary. Likewise, upon insertion of a filter cartridge, no assembling of a filter structure is required. The filter cartridge includes a thin porous filtering envelope including purifying charcoal or the like therein. No glass wool is required to complete successful filter operation. Thus, the present invention not only affords a far greater degree of convenience to the user but also increases the efficiency of the filter and the duration of time between replacement thereof due to the design of the envelope which results in a filtering area of several times that of a conventional filter without the necessity of increasing the over-all size of the filter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the present filter cartridge inserted within a filter structure.

FIG. 2 is a vertical sectional view taken along a plane passing through section line 2—2 of FIG. 1.

FIG. 3 is a transverse sectional view taken along a plane passing through section line 3—3 in FIG. 1.

FIG. 4 is a perspective view of the present filter cartridge.

Although the present invention will be described in terms relevant to its application to aquaria and fish tanks, it will be appreciated that it may be similarly applied to a tank of any size or shape. Referring specifically to the drawings, a preferred embodiment of the present invention inserted within a filtering structure is denoted by reference numeral 10 which may be mounted on a side wall 12 of a conventional aquarium or fish tank 9 as shown in FIG. 3. The structure containing the present filter cartridge comprises a tank 14 which is closed at the side and bottom of the tank. The top of the tank is opened. A cutout 16 is formed in the front wall 18 of the tank. A forwardly and downwardly sloping platform 20 projects from the cutout 16, sloping platform 20 having a vertically downwardly extending lip or flange 22 along its forward edge. As will be observed from FIG. 3, the platform 20 with its lip or flange 22 may be hooked over the aquarium wall 12 thereby disposing the filtering structure outside the aquarium with only the lip 22 and a pair of tubes (to be presently mentioned) disposed inwardly of the aquarium walls.

A side wall 24 may be secured along one edge to a front wall 18 of tank 14 and along another edge to one end of sloping platform 20. A second wall 26 opposite the first wall 24 cooperates therewith to serve as a bracket for supporting the sloping platform on the front wall of the filter tank 14. An enclosure 28 adjacent the side wall 24 in spaced relation thereto serves a purpose hereinafter explained. A spacer 30 is disposed adjacent the bottom of front wall 18 and tends to position the filter structure in a vertical position against the aquarium.

A tube 32 extends downwardly from the enclosure 28. The lower end of the tube 36 is immersed within the water contained in the aquarium, the upper outward end thereof being connected to a conventional air pump. A second tube 36 substantially paralleling the first tube is connected at the lower end thereof with the similarly disposed end of tube 32 through a connecting strainer 34.

Attention is directed to FIG. 3 of the drawings which shows that the upper ends of tube 32 communicates with the chamber 38 defined within enclosure 28. In operation of the device, air is forced into the strainer 34 thereby causing conduction of water therethrough and upwardly through tube 32. As further seen in FIG. 3, chamber 38 communicates with tank 14 over a shortened wall 40 defining a rear boundary of enclosure 28. Water delivered into chamber 38 passes over wall 40 and enters tank 14.

FIGS. 1 and 2 illustrate a vertical partition or divider 42 provided in tank 14 adjacent wall 26. This partition is affixed along its two vertical edges to the front and back walls of the tank 14. However, it is noted that the upper end does not reach the top of the rear wall nor does its bottom end reach the bottom wall of tank 14. However, the upper and lower edges of the partition are disposed inwardly of the top and bottom sides of the tank. Thus, a chamber 44 is formed between one end wall of tank 14 and partition 42 so that water delivered into chamber 38 is caused to flow over wall 40 and then down into tank 14 through the present filter cartridge as explained hereinafter. Subsequent to filtration through the cartridge, the water passes through openings 46 formed through the lower portion of the partition 42 and into the chamber 44 until the water level is sufficient to cause the flow of water into an aquarium via spillway 51.

Should the filter cartridge to be discussed become clogged with sediment or other foreign matter and therefore impassable to water, a by-pass route for the water is provided via spillway 20.

It is once more noted that the present inventive filter device utilizes a new filter cartridge with the prior art construction such as shown in Pat. 3,152,987 issued Oct. 13, 1964 to M. R. Gare hereinbefore described in detail. The specific improvement to which the present invention relates is the filter cartridge shown in FIG. 4 of the drawings and generally denoted by reference 62. The cartridge or element 62 includes an opened top tray portion 64 having a rectangular bottom and substantially rectangular retaining walls appending upwardly therefrom. The tray or shelf 64 is fabricated from a light corrosion resistant material such as plastic or the like. The bottom of the tray 64 includes a number of perforations 70 therein sufficient to prevent water buildup therein. There perforations permit the passage of water from the tray downwardly therefrom. Attention is directed to FIGS. 2 and 3 of the drawings which illustrate a flange wall portion 66 connecting the upstanding retaining walls to the bottom of the tray 64. The flange 66 forms a peripheral lip which facilitates suitable attachment such as by cementing or the like of a downwardly tapered, frusto-conical envelope or sock 68 downwardly from the bottom of tray 64. This envelope is fabricated from a porous material such as thin foam plastic, non woven plastic cloth, or the like. The envelope 68 is characterized by outwardly converging front and rear planar sides 72 and 74 along the longitudinal lower edges of the tray 64. Envelope transverse side portions 75 are of height equal to that of the front and rear sides 72 and 74 and are integral therewith. The downward edge 76 of the envelope is convexly contoured along an axis longitudinally parallel with the tray 64 thereby forming an apex of the frusto-conical envelope 68. As previously mentioned, the opposite end or base of the envelope is disposed in surrounding overlying relation with the lip 66 of the tray. It is noted that this base side of the envelope may be opened or closed depending on manufacturing and flow rate circumstances. However, it is noted that a closed base affords greater security in retaining the granular charcoal material 78 contained within the envelope, a factor especially desirable when transporting the envelope. The charcoal 78 substantially fills the entire volume enclosed within the envelope walls.

In operation of the present filter cartridge, the cartridge is placed within the tank 14 of the filter structure 10. The tray or shelf portion 64 of the filter cartridge is disposed upwardly when installing the cartridge. The top edge of the tray 64 is disposed below the top edge of the filter structure 10 thereby permitting the insertion of a dust cover thereon if desired. This may best be appreciated in viewing FIGS. 1–3 of the drawings. FIG. 3 of the drawings illustrates the displacement of the envelope apex 76 immediately above the bottom wall 50 of the tank 14 thereby permitting passage of water therealong. The figure further illustrates the tapered design of the envelope which permits a sufficient storage of filtered water within the tank 14 for steady circulation thereof. At such time when replacement of the filter cartridge is desired, the individual replacing the cartridge merely grasps the cartridge by inserting his fingers through the holes 70 in the tray portion 64 and simply lifts the cartridge upwardly and outwardly from the tank 14. The cartridge may then be discarded and a fresh one inserted into the tank 14 by merely dropping the same in place within the tank 14. FIG. 3 illustrates utilization of the cartridge during actual operation of the filter device. As will be seen from the figure, pipe 32 conducts water into the tray portion 64 of the cartridge. The water contained within this tray portion will seep downwardly through the holes 70 formed in the bottom of the tray. This water will be purified by the granular charcoal 78 contained within the envelope 66 of the cartridge. The purified water will then be filtered by the envelope walls upon passing therethrough to the chamber 44 as previously explained. Thus, the filtered sediment will remain with the envelope walls. The chamber will fill until the level of spillway 51 is exceeded at which point water will flow therefrom for return into the aquarium.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A readily replaceable filter cartridge to be simply supported in an open retainer, the cartridge comprising a downwardly tapering porous envelope terminating in a lower closed apex edge, the upper edge being opened and enlarged with respect to the apex edge for channelling fluid flow therethrough, said flow to be filtered by the envelope prior to delivery to the retainer, and a tray attached to the envelope and having a foraminous base with upstanding marginal walls integrally formed with the base for receiving delivered fluid flow, the base of the tray having apertures therein communicating with the envelope interior to enable direct passage of fluid from the tray to the envelope, the tray walls fitting into the envelope in abutting relationship with the upper envepole edge to retain the cartridge in a wide open position thereby maximizing the volume of the envelope.

2. The structure set forth in claim 1 together with a purifying substance disposed in the envelope for purifying fluid flowing through the envelope.

3. In an aquarium filtration system, the filter cartridge set forth in claim 1 together with an inlet pipe disposed in registry with the tray for delivering aquarium water to be filtered, and outlet means formed in the retainer for conveying filtered aquarium water to an aquarium tank.

References Cited

UNITED STATES PATENTS

| 546,883 | 9/1895 | Gunther | 210—169 X |
| 3,152,987 | 10/1964 | Gare | 210—169 |
| 3,249,228 | 5/1966 | Arvanitakis | 210—451 |
| 3,320,727 | 5/1967 | Farley et al. | 55—381 |
| 3,365,864 | 1/1968 | Iizima | 55—520 X |

REUBEN FRIEDMAN, Primary Examiner

T. A. GRANGER, Assistant Examiner

U.S. Cl. X.R.

210—451